(12) United States Patent
Liu et al.

(10) Patent No.: US 10,470,213 B2
(45) Date of Patent: Nov. 5, 2019

(54) METHOD AND APPARATUS FOR IMPLEMENTING LISTEN-BEFORE-TALK

(71) Applicant: Alcatel Lucent, Nozay (FR)

(72) Inventors: Jianguo Liu, Shanghai (CN); Feng Han, Shanghai (CN); Yan Meng, Shanghai (CN); Gang Shen, Shanghai (CN); Sigen Ye, Whitehouse Station, NJ (US); Jun Wang, Shanghai (CN); Matthew Baker, Canterbury (GB)

(73) Assignee: Alcatel-Lucent, Nozay (FR)

( * ) Notice: Subject to any disclaimer, the term of this patent is extended or adjusted under 35 U.S.C. 154(b) by 25 days.

(21) Appl. No.: 15/524,493

(22) PCT Filed: Nov. 3, 2015

(86) PCT No.: PCT/IB2015/002250
§ 371 (c)(1),
(2) Date: May 4, 2017

(87) PCT Pub. No.: WO2016/071764
PCT Pub. Date: May 12, 2016

(65) Prior Publication Data
US 2017/0325263 A1 Nov. 9, 2017

(30) Foreign Application Priority Data
Nov. 7, 2014 (CN) .......................... 2014 1 0625501

(51) Int. Cl.
*H04W 74/08* (2009.01)
*H04L 27/26* (2006.01)
*H04W 16/14* (2009.01)

(52) U.S. Cl.
CPC ..... *H04W 74/0816* (2013.01); *H04L 27/2692* (2013.01); *H04W 16/14* (2013.01)

(58) Field of Classification Search
CPC .............. H04W 74/0816; H04W 16/14; H04L 27/2692
See application file for complete search history.

(56) References Cited

U.S. PATENT DOCUMENTS 5,694,438 A * 12/1997 Wang .................... H04J 3/0602
375/347
2007/0162827 A1 * 7/2007 Walton ...................... H04L 1/06
714/774

(Continued)

FOREIGN PATENT DOCUMENTS

WO   WO 2012/040520 A1    3/2012

OTHER PUBLICATIONS

Qualcomm Incorporated, "Solutions for required functionalities and design targets," 3rd Generation Partnership Project (3GPP), 3GPP TSG RAN WG1 #78bis, R1-144000, pp. 1-5, XP050875301, Ljubljana, Slovenia, Oct. 6-10, 2014.

(Continued)

*Primary Examiner* — Andrew Lai
*Assistant Examiner* — Harry H Kim
(74) *Attorney, Agent, or Firm* — Fay Sharpe LLP (57) ABSTRACT

The present invention relates to a method and an apparatus for implementing Listen-Before-Talk. According to an embodiment of the present invention, if the channel assessment does not stop at a boundary of the first symbol, the preamble comprises at least a first part, and if the channel assessment stops at the boundary of the first symbol, the preamble comprises a second part. And the first part is transmitted on a remaining portion of the first symbol until the end of the first symbol, and the second part is transmitted on at least one symbol following the first symbol. Besides, (Continued)

the data is transmitted to the receiving device in at least one symbol in the subframe in which the preamble transmission ends.

18 Claims, 4 Drawing Sheets

(56) References Cited

U.S. PATENT DOCUMENTS

| | | | |
|---|---|---|---|
| 2011/0149047 A1* | 6/2011 | Min | G02B 27/2264 348/51 |
| 2011/0243261 A1* | 10/2011 | Bienas | H04W 72/1215 375/260 |
| 2014/0112289 A1* | 4/2014 | Kim | H04W 16/14 370/329 |
| 2017/0207895 A1* | 7/2017 | Yang | H04L 1/18 |
| 2017/0251442 A1* | 8/2017 | Kalhan | H04J 11/0069 |

OTHER PUBLICATIONS

Ericsson et al., "Study on Licensed-Assisted Access using LTE," 3$^{rd}$ Generation Partnership Project (3GPP), 3GPP TSG RAN Meeting #65, RP-141664, 7 pages, Edinburgh, Scotland, Sep. 9-12, 2014.

Alcatel-Lucent et al., "Regulatory Requirements for Unlicensed Spectrum," 3$^{rd}$ Generation Partnership Project (3GPP), 3GPP TSG RAN WG1 Meeting #78bis, R1-144348, pp. 1-26, Ljubljana, Slovenia, Oct. 6-10, 2014.

International Search Report for PCT/IB2015/002250 dated Feb. 25, 2016.

* cited by examiner

METHOD AND APPARATUS FOR IMPLEMENTING LISTEN-BEFORE-TALK

FIELD OF THE INVENTION

The present invention relates to communication technology, more particularly, to a method and an apparatus for implementing Listen-Before-Talk.

BACKGROUND OF THE INVENTION

The fast uptake of LTE in different regions of the world shows that the demand for wireless broadband data is increasing, and that the LTE is an extremely successful platform to meet that demand. At the same time, unlicensed spectrum is more and more considered by cellular operators as a complementary tool to augment their service offering. Therefore, in 3GPP TSG RAN #65 meeting, the Licensed-Assisted Access using LTE (LAA-LTE) was approved for Release 13 study [1].

For LAA-LTE, a critical element of the design is to ensure LAA co-existence in unlicensed band with other operators and other access technologies such as Wi-Fi on "fair" and "friendly" bases. Different regions have different regulatory requirements for unlicensed band operation as summarized in [2]. For example, in Europe, the regulations mandate the equipment operating on unlicensed spectrum to implement Listen-Before-Talk (LBT) by performing Clear Channel Assessment (CCA) before starting a transmission, so as to verify that the operating channel is not occupied. Further, two types of LBT behaviors are defined by ETSI rules: Frame-Based Equipment (FBE) and Load-Based Equipment (LBE). For FBE, CCA check is performed once every fixed frame period. If the channel is not available, the transmitter will have to wait for the entire period before the next channel access opportunity. For LBE, the eNB performs CCA check once to obtain channel access. If the channel is not available, the eNB performs an Extended CCA (eCCA). Once the eNB obtains the channel and performs a transmission, the eNB has to perform an extended CCA to access the channel again. The main differences of allowed Channel Occupancy Time and Idle Time are listed in Tab.1. As each eNB using LBE can sense the channel at any time, LBE based access may be fairer for eNBs of different operators in comparison with FBE based on access [3].

TABLE 1

Comparison between FBE and LBE

| | Channel Occupancy Time | Idle time |
|---|---|---|
| FBE | Between 1 ms and 10 ms | At least 5% of Occupancy time (500 us for 10 ms Occupancy time) |
| LBE | <=(13/32) × q ms, q = 4 . . . 32 | At least 20 us CCA observation time if the operating channel is free before transmission, otherwise including extra eCCA observation time |

However, for LBE, the LAA-LTE transmitter need perform a CCA or an Extended CCA to determine if the channel is available. Due to the random nature of interference experienced in the unlicensed spectrum, the LAA-LTE transmitter (eNB for DL and user equipment (UE) for UL) may acquire the medium at any time possibly in the middle of a subframe, and thus the end of the CCA or eCCA is not aligned with an OFDM symbol or a subframe boundary. Unlike Wi-Fi system, LTE system is a scheduling system with strict frame structure. To comply with LBT, the frame structure modifications are required for LAA-LTE so as to allow flexible channel sensing and occupancy in unlicensed bands for LBE, while still keeping or even enhancing advantages of the LTE system.

SUMMARY OF THE INVENTION

In this disclosure, a new frame structure is designed which may for example be applied with respect to LBE access in an unlicensed channel for LAA-LTE.

The basic idea of this disclosure is to transmit a short preamble in one subframe when one channel, for example an unlicensed channel, is available after channel assessment. According to one embodiment of the present invention, the remaining symbols, for example OFDM symbols, of the subframe will be used to transmit data. Herein, a purpose of the preamble may include, for example, to occupy the channel and to align the symbol boundary for data transmission, and it may further be used to implicitly indicate the start symbol position of data transmission based on preamble detection. In addition, the preamble may also assist AGC and/or synchronization etc. So this solution allows starting the data transmission in the middle of the subframe.

Although this description is written in terms of OFDM symbols, it will be understood that the invention also be applied to other kinds of symbol, including for example SC-FDMA symbols.

According to an embodiment of the present invention, data transmission with LBT and the modified frame structure works as follows: a transmitting device (e.g. a serving eNB (Licensed-Assisted Access secondary eNB, LAA SeNB, for example)) starts to perform channel assessment (CCA or eCCA, for example) at any time in a channel, and transmits a short preamble in the subframe if the channel is available at any time of the subframe. Herein, the subframe where the channel is available after the channel assessment, that is, the subframe where the (e)CCA stops, for example, is named as Channel Clear Subframe (CCSF), the subframe where the preamble is transmitted using at least one integral symbol is named as the Preamble Transmission Subframe (PTSF), and other subframes are named as Normal Available Subframe (NASF) when the channel is available. If at least one symbol is available after preamble transmission in PTSF, the transmitting device may transmit data to a receiving device (user equipment (UE), for example) in the PTSF.

According to the first aspect of the invention, there provides a method for implementing Listen-Before-Talk in a transmitting device, the method comprising the steps of:—performing channel assessment in a first channel to detect if the first channel is available, wherein the channel assessment stops at a first symbol in a first subframe; and —transmitting a preamble to a receiving device if the first channel is available; wherein if the channel assessment does not stop at a boundary of the first symbol, the preamble comprises at least a first part, and if the channel assessment stops at the boundary of the first symbol, the preamble comprises a second part; and wherein the first part is transmitted on a remaining portion of the first symbol until the end of the first symbol, and the second part is transmitted on at least one symbol following the first symbol; —transmitting data to the receiving device in at least one symbol in the subframe in which the preamble transmission ends.

Herein, the length of the first part of the preamble is a fractional part of a symbol, which enables the alignment with the symbol boundary for succeeding transmission.

The length of the whole preamble may be a fractional symbol plus one or multiple integral symbols. The number of integral symbols used for preamble can be either predefined (e.g. always 1) or signaled to the receiving device, a UE, for example. The one or multiple integral symbol allows the implicit detection of the starting symbol of the data transmission at the receiving device via preamble detection, and allows better synchronization and AGC tuning at the receiving device, for example.

According to one embodiment, the second part of preamble, that is, the part using one or multiple integral symbol, will be always transmitted when the channel is available. In this case, the transmission of the second part of preamble may occur in a different subframe from the subframe where the first part of preamble is transmitted and channel assessment is performed, i.e. the CCSF may be different from the PTSF (PTSF is subframe, which succeeds CCSF). For example, the second part of the preamble may be transmitted on one or more symbol in the beginning symbols of the subframe, which succeeds CCSF.

According to one embodiment, the transmitting device can transmit data to the receiving device in the PTSF, if at least one symbol in the subframe in which the second part is transmitted is left after the transmission of the preamble. Since PTSF may be same as CCSF or is a subframe, which succeeds CCSF, as described, the subframe, in which the data is transmitted, may be CCSF or a subframe, which succeeds CCSF.

Advantageously, the second part is transmitted under a predefined condition, wherein the predefined condition includes: at least one symbol is left in the first subframe after the transmission of the first part when the first part is transmitted; or at least one symbol is left in the first subframe after the channel assessment stops when the first part is not transmitted.

In this embodiment, the preamble may be transmitted if at least one symbol is left in the subframe after transmission of the first part of preamble, for example. In this case, the transmission of the second part of preamble can only occur in the same subframe as the transmission of the first part of preamble, i.e. the CCSF is the same as the PTSF. Therefore, this solution can minimize the resource waste of preamble in comparison.

Advantageously, if the channel assessment does not stop at the boundary of the first symbol, the preamble further comprises the second part.

Advantageously, the at least one symbol is in the first subframe, if at least one symbol in the first subframe is left after the first symbol; and the at least one symbol is in a subframe which succeeds the first subframe, if no symbol in the first subframe is left after the first symbol. That is, the CCSF may be same as the PTSF or different from the PTSF.

Advantageously, at least one of the first part and the second part is used for at least one of the following: occupying the first channel, indicating a start symbol for data transmission, assisting antenna gain control, assisting synchronization, assisting channel tracking, and/or assisting channel measurement. This will enhance communication robustness.

Advantageously, the number of symbols used by the second part is predefined or configured using a higher-layer signaling.

Advantageously, the data is a redundancy version of data prepared for a succeeding subframe, more specifically, the succeeding subframe of the subframe, in which the preamble transmission ends, for example. In this embodiment, a redundancy version of the encoding data for the next NASF is transmitted in the PTSF, which improves the data transmission reliability.

Advantageously, the data is jointly encoded with data prepared for a succeeding subframe, more specifically, the succeeding subframe of the subframe, in which the preamble transmission ends, for example. In this embodiment, data transmission in the PTSF is jointly encoded with the data in the next NASF. This allows higher transport block size for transmission.

Advantageously, the data is encoded independently from the data prepared for a succeeding subframe, more specifically, the succeeding subframe of the subframe, in which the preamble transmission ends, for example. In this embodiment, data transmission in the PTSF is encoded independently from the data in the next NASF. This allows an additional transport block to be transmitted.

Advantageously, the method further comprises: signaling, in a second subframe, resource allocation information for the data transmission, wherein the second subframe is a subframe which succeeds the subframe in which the data transmission occurs.

For example, the signaling can be achieved by using downlink control information in the second subframe. This embodiment refers to the situation in which the transmitter (LAA SeNB, for example) schedules the receiving device, for example.

Alternatively, the method further comprises: signaling, in a third subframe, resource allocation information for the data transmission, wherein the third subframe is on a second channel. In this embodiment, the resource allocation information is transmitted on a different channel from the one on which the second part is transmitted. This embodiment refers to the situation for cross-carrier schedule, for example.

In the above two embodiments, the transmissions in the PTSF and the next adjacent NASF to a receiving device use the same frequency resource. Thus, the resource allocation information in PTSF could be signaled to the scheduled UEs using the same DCI in next NASF, for example.

Advantageously, the method further comprises:—transmitting a first signaling to the receiving device to indicate the receiving device to begin to perform preamble detection in every subframe, or to stop performing the preamble detection in every subframe.

Advantageously, the method further comprises:—transmitting a second signaling to the receiving device to indicate to the receiving device at least one subframe in which it should perform the preamble detection.

The first signaling and/or the second signaling can be a high layer signaling, such as a RRC signaling or a new Layer 1 signaling.

According to the second aspect of the invention, there provides a method for implementing Listen-Before-Talk in a receiving device, the method comprising the steps of: a. determining whether a preamble from a transmitting device is detected on a first channel; b. if the preamble is detected, estimating a number of symbols for data transmission in the subframe in which the transmission of the preamble stops, based on the preamble; c. buffering a first data, which is transmitted in the symbols; and d. decoding at least the first data with reference to control information received in a succeeding subframe on the first channel or a second channel.

Advantageously, the method further comprises:—receiving a first signaling from the transmitting device, which indicates the receiving device to begin to perform preamble detection in every subframe, or to stop performing preamble detection in every subframe; and the step a further includes: detecting the preamble from the transmitting device based on the first signaling.

Advantageously, the method further comprises:—receiving a second signaling from the transmitting device, which indicates to the receiving device in which at least one subframe it should perform preamble detection; and the step a further includes: detecting the preamble from the transmitting device based on the second signaling.

According to the third aspect of the invention, there provides an apparatus for implementing Listen-Before-Talk in a transmitting device, the apparatus comprising: a detecting unit, configured for performing channel assessment in a first channel to detect if the first channel is available, wherein the channel assessment stops at a first symbol in a first subframe; and a transmitting unit, configured for transmitting a preamble to a receiving device if the first channel is available; wherein if the channel assessment does not stop at a boundary of the first symbol, the preamble comprises at least a first part, and if the channel assessment stops at the boundary of the first symbol, the preamble comprises a second part; and wherein the first part is transmitted on a remaining portion of the first symbol until the end of the first symbol, and the second part is transmitted on at least one symbol following the first symbol; and a data transmitting unit, configured for transmitting data to the receiving device in at least one symbol in the subframe in which the preamble transmission ends.

According to the fourth aspect of the invention, there provides an apparatus for implementing Listen-Before-Talk in a receiving device, the apparatus comprising: a determining unit, configured for determining whether a preamble from a transmitting device is detected on a first channel; an estimating unit, configured for estimating a number of symbols for data transmission in the subframe in which the transmission of the preamble stops based on the preamble, if the preamble is detected; a buffering unit, configured for buffering a first data, which is transmitted in the symbols; and a decoding unit, configured for decoding at least the first data with reference to control information received in a succeeding subframe on the first channel or a second channel.

With the present invention, the following benefits can be achieved:

It is able to comply with the requirement of LBT regulator (for example in Europa and Japan) with appropriate setting of maximum channel occupancy.

It enables LAA SeNB to grab the channel as easily as Wi-Fi, and to avoid restricting LAA SeNB to grab the channel only at subframe boundaries.

The data transmission can be transmitted on the channel (an unlicensed channel, for example) in the middle of a subframe after the channel is available, which is helpful to avoid the resource waste and thus improves system spectrum efficiency.

A short preamble design is able to indicate the start position of data transmission in the PTSF without DCI modification and extra signaling introduction. In addition, the preamble can further assist AGC and/or synchronization etc.

That Data transmission stops at a subframe boundary is able to reduce the system complexity as no extra signaling is required to indicate the final symbol of the data transmission.

Resource waste for grabbing channel is avoided and thus it achieves higher system spectrum efficiency in comparison with existing solution.

BRIEF DESCRIPTION OF DRAWINGS

With reference to the following detailed description of the non-restrictive embodiments, other features, objects and advantages of the present invention will be more apparent.

Wherein same or similar reference numerals refer to same or similar apparatuses (modules) or steps.

DETAILED DESCRIPTION OF EMBODIMENTS

In the following, the embodiments are described in terms of OFDM symbols, LAA SeNB, UE, (e)CCA and an unlicensed channel. However, it is appreciated for those skilled in the art the above technical terms are all merely used to illustrate the present invention, but does not intent to limit its application. For example, the present invention can also be applied to SC-FDMA symbols, as described above.

Figure 1:
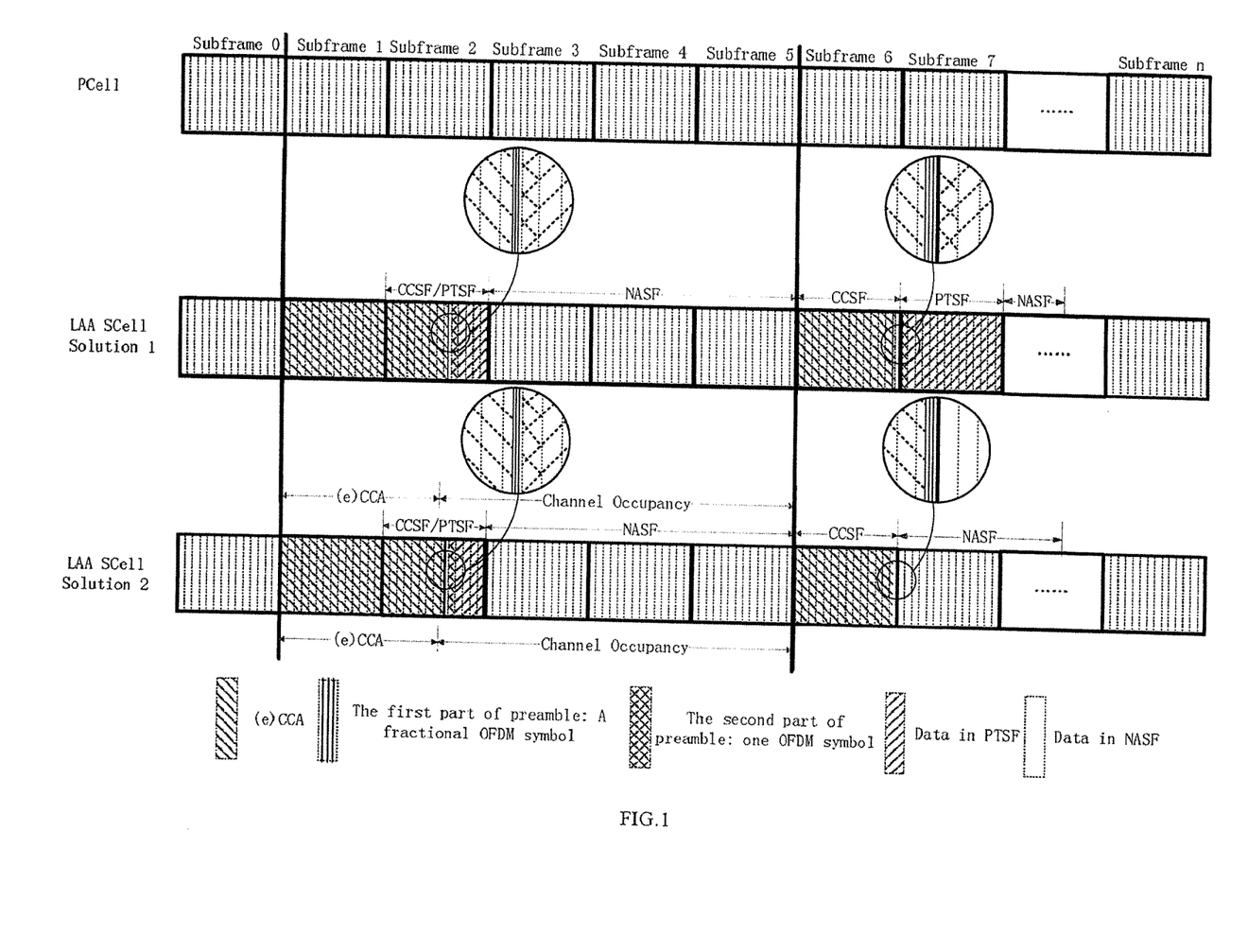
FIG. 1 shows a frame structure design based on access in a LAA secondary cell (SCell) according to an embodiment of the present invention.

FIG. 1 shows a frame structure design based on access in a LAA secondary cell (SCell) according to an embodiment of the present invention. Three frame structures, that is frame structure for primary cell (PCell), frame structure for LAA SCell for solution 1 and frame structure for LAA SCell for solution 2, are shown in FIG. 1. Each subframe includes 14 OFDM symbols, shown as rectangular shape. Different patterns in the rectangle represent OFDM symbols for different usage, as shown in FIG. 1. In this embodiment, for illustration, the second part of preamble occupies one OFDM symbol.

Further, each frame structure consists of two parts of time: (e)CCA time $t_{(e)CCA}$ and channel occupancy time $t_{OC}$. The (e)CCA time and channel occupancy time should meet the requirement of different region regulators on demand. For example, the maximum channel occupancy time should be less than $(13/32) \times q$ ms in Europe as listed in Tab.1, and is less than 4 ms in Japan [2].

Figure 2:
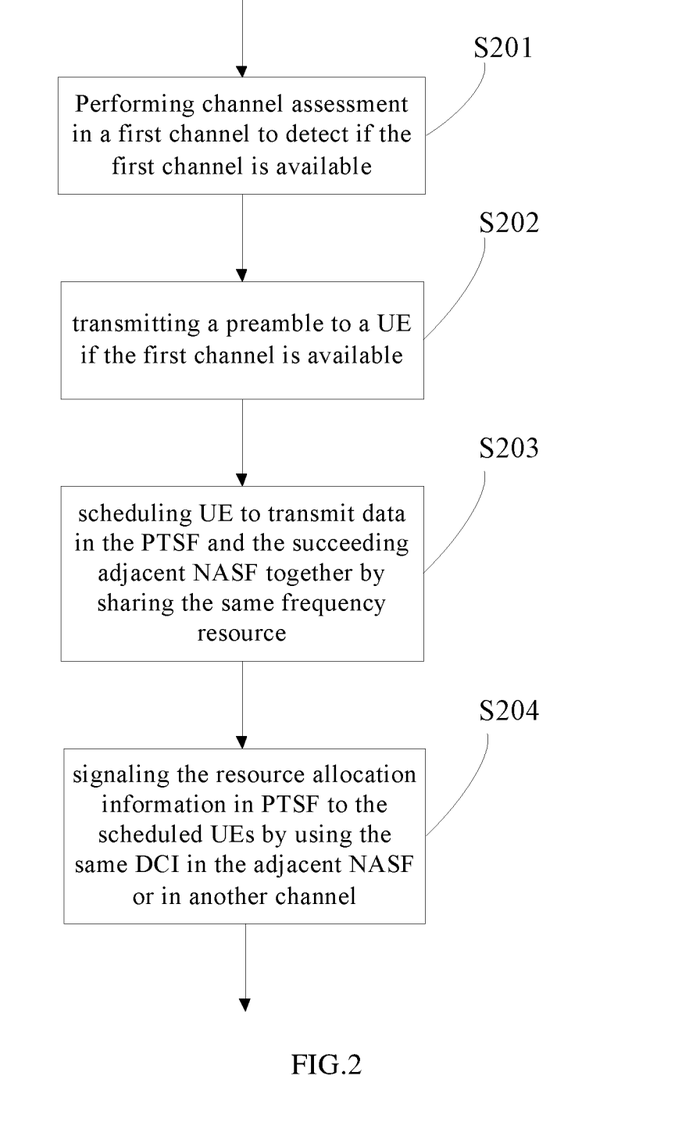
FIG. 2 shows a method flowchart of a method for implementing Listen-Before-Talk in a LAA SeNB in a LAA-LTE based communication system according to one embodiment of the present invention.

Since the (e)CCA time is variable for LBE, the LAA-LTE transmitter in a LAA SeNB may acquire the medium at any time possibly in the middle of a subframe, and thus the end of the CCA or eCCA may be not aligned with the symbol boundary [2]. As the transmission on the licensed and unlicensed channel is synchronous, if the unlicensed transmitter waits until the next OFDM symbol or subframe boundary to begin transmission, it risks the possibility of losing the channel to other neighboring nodes and waiting for the channel to become free. Therefore, besides data transmission, a short preamble is transmitted as a part of channel occupancy period for the present solution as shown in FIG. 2. The solution of the present invention is based on the unit of symbol. Herein, the short preamble may have two components:

The first part of preamble: the fractional part of an OFDM symbol in the CCSF, which is transmitted in the time between the end of (e)CCA and the next OFDM symbol boundary. The signature transmitted on this part can be a random signal. The purpose of this design is to grab channel after the channel is clear, and further align the OFDM symbol boundary for succeeding transmission in the current subframe.

The second part of preamble: at least one OFDM symbol. The signal transmitted on this part can uniquely identify the transmitter which grabbed the medium and can enable the data transmission at the next OFDM symbol boundary. Based on the blind detection of the preamble, the served UEs would know the exact start OFDM symbol position of data in the PTSF. Furthermore, the preamble can also be used to assist AGC and/or synchronization etc.

Additionally and/or alternatively, at least one of the first part and the second part is used for at least one of the following: occupying the channel, indicating a start symbol for data transmission, assisting antenna gain control, assisting synchronization, assisting channel tracking, and/or assisting channel measurement.

As shown in FIG. 1, two alternative options are illustrated for transmission of the second part of preamble, as also discussed below:

Solution 1: The second part of the preamble will be always transmitted when the channel (unlicensed channel, for example) is available, which will is able to assist AGC, synchronization, channel tracking, channel measurement and etc., besides indicating the start OFDM symbol position of data in the PTSF. In this case, the transmission of the second part of preamble may occur in the different subframe from the subframe where the transmission of the first part of preamble occurs, i.e. the CCSF may be different from the PTSF.

Solution 2: The second part of the preamble may be transmitted only if at least one OFDM symbol is left in the subframe after transmission of the first part of preamble or if at least one OFDM symbol is left in the subframe after eCCA or CCA when the first part is not transmitted. In this case, the transmission of the second part of preamble can only occur in the same subframe as the transmission of the first part of preamble, i.e. the CCSF is the same as the PTSF. Therefore, solution 2 can minimize the resource waste of preamble in comparison with solution 1.

So the proposed frame structure solution can allow starting the data transmission in the middle of the PTSF as illustrated in FIG. 2, which is able to avoid the resource waste, and thus improve system spectrum efficiency. For illustration purpose, here it is assumed that data transmission always stops at the subframe boundary. And it is assumed that the maximum channel occupancy time is $t_{OC}$ ms (e.g. 4 ms). In this case, the possible channel occupancy time for data transmission can be calculated based on the following formulas:

For solution 1:

$$t_{OC,ACTUAL} = \begin{cases} \{N - (S_{(e)CCA} + 2)\} \text{ Symbols in } PTSF + (t_{OC} - 1) \text{ NASFs}, \\ N - (S_{(e)CCA} + 2) \geq 0 \\ (N - 1) \text{ Symbols in } PTSF + (t_{OC} - 1) \text{ NASFs}, \\ (e)CCA \text{ stops at the boundary of the last } OFDM \text{ symbol} \\ (N - 1) \text{ Symbols in } PTSF + (t_{OC} - 2) \text{ NASFs}, \\ (e)CCA \text{ stops at the middle of the last } OFDM \text{ symbol} \end{cases}$$

For solution 2:

$$t_{OC,ACTUAL} =$$

$$\begin{cases} N - (S_{(e)CCA} + 2) \text{ Symbols in } PTSF + (t_{OC} - 1) \text{ NASFs}, \\ N - (S_{(e)CCA} + 2) \geq 0 \\ t_{OC} \text{ NASFs}, (e)CCA \text{ stops at the boundary of the last} OFDM \text{ symbol} \\ (t_{OC} - 1) \text{ NASFs}, \\ (e)CCA \text{ stops at the middel of the last } OFDM \text{ symbol} \end{cases}$$

where N is the number of OFDM symbols in a subframe, and $S_{(e)CCA} \in \{0, \ldots, N-1\}$ denotes the symbol position of (e)CCA when the channel is available in the subframe.

FIG. 2 shows a method flowchart of a method for implementing Listen-Before-Talk in a LAA SeNB in a LAA-LTE based communication system according to one embodiment of the present invention.

Firstly, in step S201, the LAA SeNB performs channel assessment in a first channel to detect if the first channel is available. The first channel can be an unlicensed channel, for example. The channel assessment includes CCA, (e)CCA and etc.

In step S202, the LAA SeNB transmits a preamble to a UE if the first channel is available.

Specifically, if the channel assessment (the last (e)CCA, for example) doesn't stop at the end of one OFDM symbol, the first part of preamble will be transmitted to grab the channel and align the OFDM symbol for succeeding transmission. Otherwise, the first part of preamble is not transmitted.

If at least one integral OFDM symbol is left in the subframe after channel assessment (eCCA or CCA detection, for example), the second part of preamble will be transmitted to indicate the start OFDM symbol of data transmission in the current subframe.

If the channel is available at the last OFDM symbol of a subframe, the second part of preamble need be transmitted at the first OFDM symbol of the adjacent subframe, for example, for solution 1, as described above. Otherwise, it doesn't need to be transmitted for solution 2, as described above.

In step S203, the LAA SeNB may schedule UE to transmit data in the PTSF and the succeeding adjacent NASF together by sharing the same frequency resource.

Specifically, three alternative options are proposed to prepare data for transmission in the PTSF as below:

a. Jointly encoding data in the PTSF with the data in the next adjacent NASF. This is able to improve the system throughput by increasing the transport block size. For this option, the fast signaling process capability is required to prepare new data transmission at the LAA SeNB side when channel is available.

b. A redundancy version of the data prepared for next NASF is transmitted in the PTSF. This will improve the channel reliability and reduce the packet error probability.

c. The data in the PTSF is encoded independently from the data prepared for transmission in a succeeding subframe.

In step S204, the resource allocation information in PTSF is signaled to the scheduled UEs in the adjacent NASF, or in another channel, for example, scheduled by PeNB. This can be achieved by using the same DCI. That is, the resource allocation information in PTSF can be indicated in the adjacent NASF, for example.

Additionally, the method could further include the following step. A new high layer signaling (e.g. RRC signaling) or Layer 1 signaling from PCell or LAA SCell can be designed for the UE in the channel to determine if the preamble detection is required on the channel, which will be helpful to reduce the monitoring complexity and power consumption of the UE.

Specifically, a first signaling is transmitted to the UE to indicate the UE to begin to perform preamble detection in every subframe, or to stop performing the preamble detection in every subframe. This first signaling could be transmitted by PCell or SCell.

Alternatively, a second signaling is transmitted to the UE to indicate to the UE at least one subframe in which it should perform the preamble detection. Similarly, this second signaling could be transmitted by PCell or SCell.

Besides, the method could further include the following step: the number of symbols in the second part is predefined or configured using a higher-layer signaling. Thus, UE can know the number of related symbols, OFDM symbols, for example.

Figure 3:
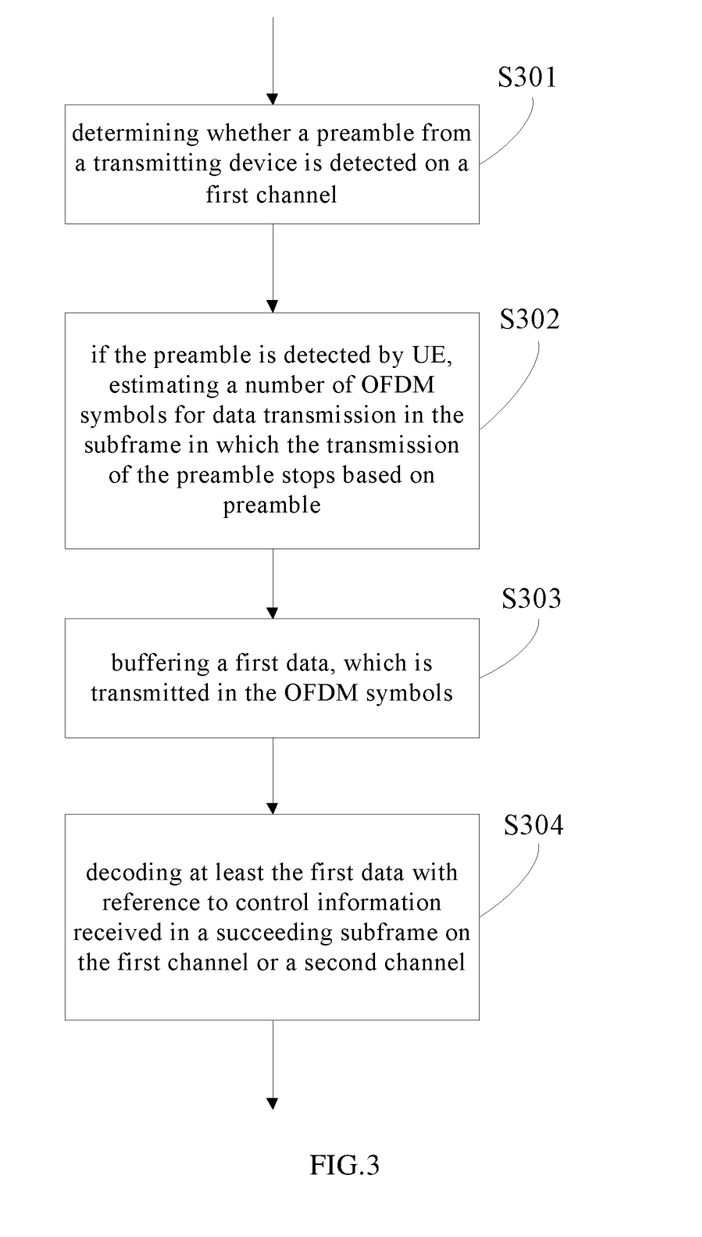
FIG. 3 shows a method flowchart of a method for implementing Listen-Before-Talk in a UE in a LAA-LTE based communication system according to another embodiment of the present invention.

FIG. 3 shows a method flowchart of a method for implementing Listen-Before-Talk in a UE in a LAA-LTE based communication system according to another embodiment of the present invention. With the data transmission possibly starting in the middle of a subframe, the receiving device (UE, for example) would need to know when the data transmission starts in order to decode the packet. This embodiment will be helpful to solve this problem.

As shown in FIG. 3, in step S301, UE determines whether a preamble from a transmitting device (LAA SeNB, for example) is detected on a first channel.

In step S302, if the preamble is detected by UE, UE estimates a number of OFDM symbols for data transmission in the subframe in which the transmission of the preamble stops based on the information contained in the preamble.

In step S303, UE buffers a first data, which is transmitted in the OFDM symbols.

Specifically, in those two steps, UE would receive and buffer all the remaining signal data in PTSF and then estimate the number of OFDM symbols in PTSF for data transmission. Those two steps could be implemented in the meanwhile.

In step S304, UE decodes at least the first data with reference to control information received in a succeeding subframe on the first channel or a second channel. For example, in the adjacent NASF, each UE need further monitor and detect the DCI in (e)PDCCH from PCell or LAA SCell to check if it is scheduled. If so, the UE would decode the data in the PTSF based on the relevant DCI. Additionally, the UE will also decode the data in the adjacent NASF together with the data in the PTSF.

Additionally, UE can receive a high layer signaling or a new Layer 1 signaling from LAA SeNB or PeNB. For example, this signaling will indicate UE to begin to perform preamble detection in every subframe, or to stop performing preamble detection in every subframe. Alternatively, the signaling will indicate UE in which subframe it should perform preamble detection. Correspondingly, UE will perform the preamble detection based on the above signal in step 301 above.

According to an embodiment of the present invention, UE need monitor downlink control information in the succeeding subframe of the first channel or the second channel in order to decode data transmitted in the succeeding subframe of the first channel. Specifically, UE need monitor the DCI in (e)PDCCH from PCell or LAA SCell in the succeeding NASFs. In this case, the complexity at UE side would be reduced as it doesn't need to monitor the preamble in each subframe.

Figure 4:
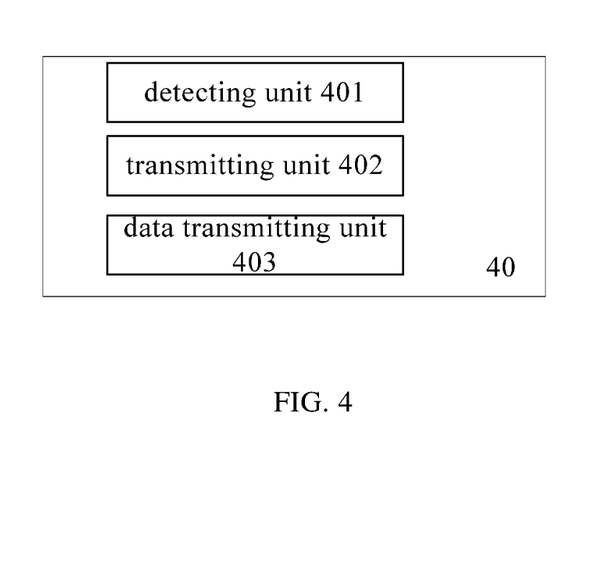
FIG. 4 shows a schematic diagram of an apparatus for implementing Listen-Before-Talk in a LAA SeNB in a LAA-LTE based communication system according to one embodiment of the present invention.

FIG. 4 shows a schematic diagram of an apparatus for implementing Listen-Before-Talk in a LAA SeNB in a LAA-LTE based communication system according to one embodiment of the present invention. The apparatus 40 includes a detecting unit 401, a transmitting unit 402 and a data transmitting unit 403.

The detecting unit 401 is configured for performing channel assessment in a first channel to detect if the first channel is available, wherein the channel assessment stops at a first symbol in a first subframe.

The transmitting unit 402 is configured for transmitting a preamble to a receiving device if the first channel is available.

Herein, if the channel assessment does not stop at a boundary of the first symbol, the preamble comprises at least a first part, and if the channel assessment stops at a boundary of the first symbol, the preamble comprises a second part. And the first part is transmitted on a remaining portion of the first symbol until the end of the first symbol, and the second part is transmitted on at least one symbol following the first symbol.

The data transmitting unit 403 is configured for transmitting data to the receiving device in at least one symbol in the subframe in which the preamble transmission ends.

Figure 5:
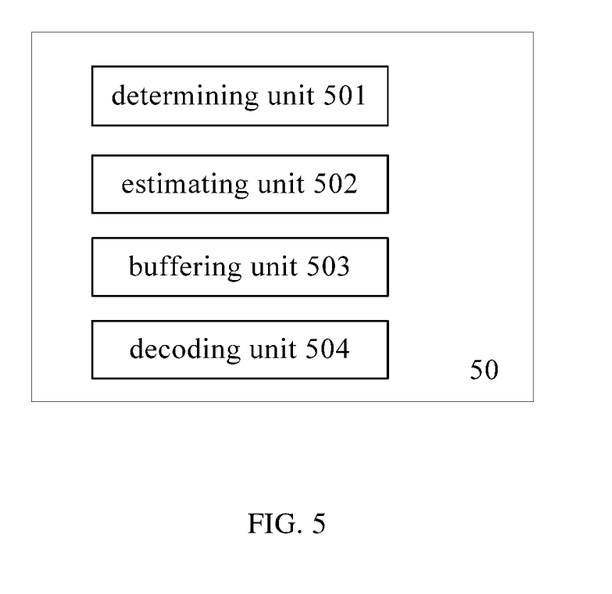
FIG. 5 shows a schematic diagram of an apparatus for implementing Listen-Before-Talk in a UE in a LAA-LTE based communication system according to another embodiment of the present invention.

FIG. 5 shows a schematic diagram of an apparatus for implementing Listen-Before-Talk in a UE in a LAA-LTE based communication system according to another embodiment of the present invention. The apparatus 50 includes a determining unit 501, an estimating unit 502, a buffering unit 503 and a decoding unit 504.

The determining unit 501 is configured for determining whether a preamble from a transmitting device is detected on a first channel.

The estimating unit 502 is configured for estimating a number of symbols for data transmission in the subframe in which the transmission of the preamble stops based on the preamble, if the preamble is detected.

The buffering unit 503 is configured for buffering a first data, which is transmitted in the symbols.

The decoding unit 504 is configured for decoding at least the first data with reference to control information received in a succeeding subframe on the first channel or a second channel.

It shall be appreciated that the foregoing embodiments are merely illustrative but will not limit the invention. Any technical solutions without departing from the spirit of the invention shall fall into the scope of invention, including the use of different technical solutions appearing in different embodiments, and an apparatus and a method can be combined to advantage. Moreover any reference numerals in the claims shall not be construed as limiting the claims in question; and the term "comprising" will not preclude another device(s) or step(s) which is (are) listed in the other claim(s) or the description.

REFERENCE

[1]. RP-141664, Study on Licensed-Assisted Access using LTE", Ericsson, Qualcomm, Huawei, Alcatel-Lucent;
[2]. R1-144348, Regulatory Requirements for Unlicensed Spectrum, Alcatel-Lucent, Alcatel-Lucent Shanghai Bell, Ericsson, Huawei, HiSilicon, IAESI, LG, Nokia Corporation, Nokia Networks, Qualcomm, NTT Docomo;
[3]. R1-144000, Solutions for required functionalities and design targets Qualcomm Inc.

The invention claimed is:

1. A method for implementing Listen-Before-Talk in a transmitting device, the method comprising:
performing channel assessment in a first channel to detect if the first channel is available, wherein the channel assessment stops at a first symbol in a first subframe;
transmitting a preamble to a receiving device if the first channel is available;
wherein if the channel assessment stops at a point other than at a boundary of the first symbol, the preamble comprises at least a first part, and if the channel assessment stops at the boundary of the first symbol, the preamble comprises a second part;
and wherein the first part is transmitted on a remaining portion of the first symbol until the end of the first symbol, and the second part is transmitted on at least one symbol following the first symbol; and
transmitting data to the receiving device in at least one symbol in the subframe in which the preamble transmission ends.

2. The method according to claim 1, wherein the second part is transmitted under a predefined condition, wherein the predefined condition includes:
at least one symbol is left in the first subframe after the transmission of the first part when the first part is transmitted; or
at least one symbol is left in the first subframe after the channel assessment stops when the first part is not transmitted.

3. The method according to claim 1, wherein if the channel assessment does not stop at the boundary of the first symbol, the preamble further comprises the second part.

4. The method according to claim 1, wherein
the at least one symbol is in the first subframe, if at least one symbol in the first subframe is left after the first symbol; and
the at least one symbol is in a subframe which succeeds the first subframe, if no symbol in the first subframe is left after the first symbol.

5. The method according to claim 1, wherein at least one of the first part and the second part is used for at least one of the following: indicating a start symbol for the data transmission, assisting antenna gain control, assisting synchronization, assisting channel tracking, and/or assisting channel measurement.

6. The method according to claim 1, wherein the number of symbols used by the second part is predefined or configured using a higher-layer signaling.

7. The method according to claim 1, wherein the data is a redundancy version of data prepared for transmission in a succeeding subframe.

8. The method according to claim 1, wherein the data is jointly encoded with data prepared for transmission in a succeeding subframe.

9. The method according to claim 1, wherein the data is encoded independently from the data prepared for transmission in a succeeding subframe.

10. The method according to claim 1, wherein the method further comprises:
signaling, in a second subframe, resource allocation information for the data transmission, wherein the second subframe is a subframe which succeeds the subframe in which the data transmission occurs.

11. The method according to claim 1, wherein the method further comprises:
signaling, in a third subframe, resource allocation information for the data transmission, wherein the third subframe is on a second channel.

12. The method according to claim 1, wherein the method further comprises:
transmitting a first signaling to the receiving device to indicate the receiving device to begin to perform preamble detection in every subframe, or to stop performing the preamble detection in every subframe.

13. The method according to claim 1, wherein the method further comprises:
transmitting a second signaling to the receiving device to indicate to the receiving device at least one subframe in which it should perform the preamble detection.

14. A method for implementing Listen-Before-Talk in a receiving device, the method comprising:
determining whether a preamble from a transmitting device is detected on a first channel wherein the preamble comprises at least one of a first part and a second part and wherein the first part is transmitted on a remaining portion of a first symbol until the end of the first symbol if the preamble comprises the first part, and the second part is transmitted on at least one whole symbol if the preamble comprises the second part;
if the preamble is detected, estimating a number of symbols for data transmission in the subframe in which the transmission of the preamble stops, based on the preamble;
buffering a first data, which is transmitted in the symbols; and
decoding at least the first data with reference to control information received in a succeeding subframe on the first channel or a second channel.

15. The method according to claim 14, wherein the method further comprises:
receiving a first signaling from the transmitting device, which indicates the receiving device to begin to perform preamble detection in every subframe, or to stop performing the preamble detection in every subframe; and
the determining further includes:
detecting the preamble from the transmitting device based on the first signaling.

16. The method according to claim 14, wherein the method further comprises:
receiving a second signaling from the transmitting device, which indicates to the receiving device in which at least one subframe it should perform preamble detection; and
the determining further includes:
detecting the preamble from the transmitting device based on the second signaling.

17. An apparatus for implementing Listen-Before-Talk in a transmitting device, the apparatus comprising:
- at least one processor; and
- at least one memory including computer program code configured to, with the at least one processor, cause the apparatus to at least:
- perform channel assessment in a first channel to detect if the first channel is available, wherein the channel assessment stops at a first symbol in a first subframe;
- transmit a preamble to a receiving device if the first channel is available;
- wherein if the channel assessment stops at a point other than at a boundary of the first symbol, the preamble comprises at least a first part, and if the channel assessment stops at the boundary of the first symbol, the preamble comprises a second part;
- and wherein the first part is transmitted on a remaining portion of the first symbol until the end of the first symbol, and the second part is transmitted on at least one symbol following the first symbol; and
- transmit data to the receiving device in at least one symbol in the subframe in which the preamble transmission ends.

18. An apparatus for implementing Listen-Before-Talk in a receiving device, the apparatus comprising:
- at least one processor; and
- at least one memory including computer program code configured to, with the at least one processor, cause the apparatus to at least:
- determine whether a preamble from a transmitting device is detected on a first channel wherein the preamble comprises at least one of a first part and a second part and wherein the first part is transmitted on a remaining portion of a first symbol until the end of the first symbol if the preamble comprises the first part, and the second part is transmitted on at least one whole symbol if the preamble comprises the second part;
- estimate a number of symbols for data transmission in the subframe in which the transmission of the preamble stops based on the preamble, if the preamble is detected;
- buffer a first data, which is transmitted in the symbols; and
- decode at least the first data with reference to control information received in a succeeding subframe on the first channel or a second channel.

* * * * *